United States Patent [19]
Tokunaga et al.

[11] Patent Number: 5,673,187
[45] Date of Patent: Sep. 30, 1997

[54] POWER SUPPLY SYSTEM

[75] Inventors: Atsuo Tokunaga, Hadano; Masahide Nakaya, Chigasaki, both of Japan

[73] Assignee: Ricoh Company, Ltd., Tokyo, Japan

[21] Appl. No.: 576,200

[22] Filed: Dec. 21, 1995

[30] Foreign Application Priority Data

Dec. 26, 1994 [JP] Japan .................... 6-322688

[51] Int. Cl.$^6$ .................................. H02M 7/00
[52] U.S. Cl. .......................... 363/65; 323/268
[58] Field of Search .................... 363/20, 21, 65, 363/71; 323/268, 267, 266

[56] References Cited

U.S. PATENT DOCUMENTS 4,761,702  8/1988  Pinard ........................... 361/18
5,262,933  11/1993  Shyi-Hon ....................... 363/49

Primary Examiner—Peter S. Wong
Assistant Examiner—Rajnikant B. Patel
Attorney, Agent, or Firm—Lowe, Price, LeBlanc & Becker

[57] ABSTRACT

A first power source for providing a positive voltage and a second power source for providing a negative voltage are selectively activated to supply a positive or a negative voltage to a load. A rectifying element is connected between the first and second power sources to prevent electric current from flowing through the second power source when only the first power source is active. A switch and a resistor for generating a feedback current are connected in series with an output terminal of the first power source and a terminal of the load. The switch is opened to prevent current flow through the resistor when only the second power supply is active.

8 Claims, 9 Drawing Sheets

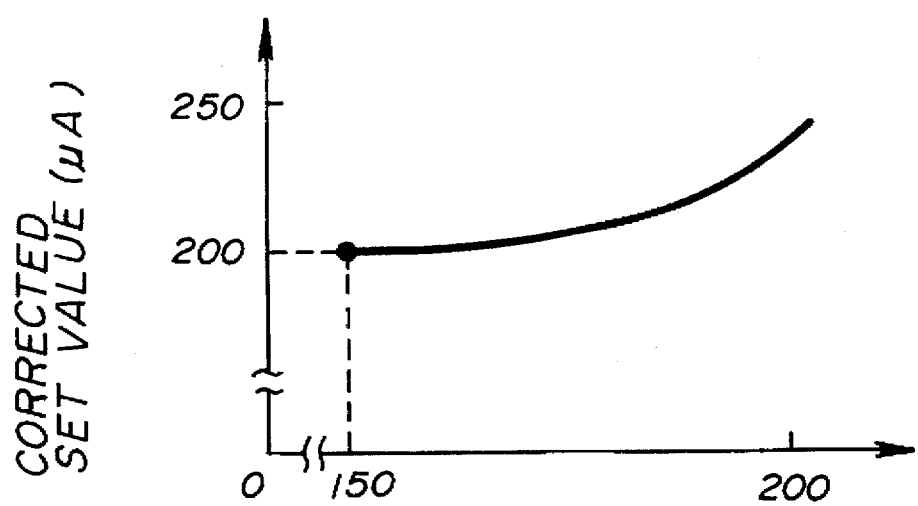

POWER SUPPLY SYSTEM

BACKGROUND OF THE INVENTION

1. Field of the Invention

The present invention relates to a power supply system for supplying power in image formation, and, in particular, to a power supply system for applying a voltage to a toner transfer member in an image formation apparatus. In such an image formation apparatus, a toner image formed on an image carrier member is transferred to a recording medium sheet such as a sheet of paper placed in proximity to a toner transfer unit including the toner transfer member. This transfer is made as a result of charging the toner on the image carrier member to be at a bias voltage of a certain polarity (for example, a negative polarity) and charging the toner transfer member to be at a bias voltage of an opposite polarity (a positive polarity in this example). As a result, the recording medium sheet is positively charged and thus the toner on the image carrier member is transferred to the recording medium sheet as a result of electrical attraction. Thus, the toner image is transferred onto the recording medium sheet.

2. Description of the Related Art

Such an image formation apparatus includes an electrophotographic image forming apparatus which includes an electrophotographic printer. In such an apparatus, the toner transfer member and/or a shield surrounding the toner transfer member is likely to be stained with toner materials after such a toner transfer operation as that mentioned above is repeated. In order to reduce such a staining phenomenon, a bias voltage of the same polarity (the negative polarity in this example) as that at which the toner is charged may be applied to the toner transfer member during a time the toner transfer operation is not performed. As a result, the toner is electrically repelled by the toner transfer member and thus the toner transfer member and the shield are prevented from being stained with the toner materials.

With reference to FIGS. 1 and 2, power supply systems in the related art for supplying both positive and negative bias voltages to the toner transfer member will now be described. In this example, a polarity of the toner is negative.

The power supply system shown in FIG. 1 includes a first power source 1 for applying a positive bias voltage (opposite polarity to that of the toner). A second power source 5 applies a negative bias voltage (the same as that of the toner). Either a first terminal T11 of the power source 1 or a first terminal T21 of the power source 5 is connected to the toner transfer member (corresponding to a terminal of a load 15) via a change-over switch 10.

When the bias voltage of the polarity (positive polarity) opposite to that of the toner is applied to the toner transfer member, the change-over switch 10 is operated so that with a terminal S1 is connected to an output terminal 14. When power is supplied to the load 15 by means of the first power source 1, an electric current I11 flows through a resistor R12 in a current detecting circuit 11. A voltage appearing across the resistor R12 depends on the current I11 flowing through the resistor R12 and is detected as a current feedback signal FBI and compared with a relevant reference voltage. Each pulse span in a pulse-width modulation (PWM) signal in the first power source 1 is controlled so that the voltage of the signal FBI is equal to the relevant reference voltage, the current I11 being thus controlled to be constant. Thus a bias voltage applied to the output terminal 14 and thus to the load 15 is controlled in a constant-current control manner.

When the bias voltage of the polarity (negative polarity) the same as that of the toner is applied to the toner transfer member, the change-over switch 10 is operated and thus a terminal S2 is connected to the output terminal 14. When power is supplied to the load 15 by means of the second power source 5, a voltage V22 appearing across a resistor R22 in a voltage detecting circuit 13 is detected as a voltage feedback signal FBV and compared with a relevant reference voltage. Each pulse span in a pulse-width modulation (PWM) signal in the second power source 5 is controlled so that the voltage of the signal FBV is equal to the relevant reference voltage, the output voltage V21 being thus controlled to be constant. Thus a bias voltage applied to the output terminal 14 and thus to the load 15 is controlled in a constant-voltage control manner.

The output voltage V21 appearing across a series circuit of resistors R21 and R22 is distributed according to a ratio of the resistances thereof. Specifically, $V21:V22=(R21+R22):R22$. Thus, the voltage V22 depends on the output voltage V21 of the second power source 5.

In such a power supply system in the related art, each of the bias voltages of the (negative and positive) polarities the same as and opposite to that of the toner is applied to the change-over switch 10. Each of the thus-applied bias voltages is used for achieving a respective one of effects of transferring the toner from the image carrier member to the recording medium sheet and causing the toner to be repelled by the toner transfer member as mentioned above. In order to ensure achieving these two effects, a voltage difference between the bias voltages of the negative and positive polarities is required to be large (for example, several kilovolts). As a result, the change-over switch 10 should be one capable of enduring a high-voltage being applied thereto. As a result, relatively high costs are required for the change-over switch.

Another example of the power supply system in the related art will now be described with reference to FIG. 2. In the system shown in FIG. 2, as shown in the figure, the first terminal T21 of the second power source 5 is connected to a second terminal T12 of the first power source 1. Thus, the two power sources are connected in series between the output terminal 14 and the ground.

When the bias voltage of the polarity (positive polarity) opposite to that of the toner is applied to the toner transfer member (the terminal of the load 15), the first power source 1 supplies the bias voltage at the output terminal 14 and thus the load 15. As a result, an electric current I21 flows through the resistor R22 in the voltage detecting circuit 13 and thus a voltage V22 appears across the resistor R22. The voltage V22 appearing across the resistor R22 depends on an electric current flowing through the resister R22 and is compared with the reference voltage. Each pulse span in the PWM signal in the first power source 1 is controlled so that this voltage is equal to the relevant reference voltage, the current I21 being thus controlled to be constant. Thus, the output supplied to the load 15 is controlled in the constant-current manner.

When the bias voltage of the polarity (negative polarity) the same as that of the toner is applied to the tone transfer member (the terminal of the load 15), the second power source 5 supplies the bias voltage at the output terminal 14 and thus the load 15. The voltage V22 appearing across the resistor R22 in the voltage detecting circuit 13 is compared with the relevant reference voltage. Each pulse span in the PWM signal in the second power source 5 is controlled so that the voltage V22 is equal to the relevant reference voltage, the output voltage V21 being thus controlled to be constant. Thus a bias voltage applied to the output terminal 14 and thus to the load 15 is controlled in the constant-voltage control manner.

The output voltage V21 appearing across the series circuit of resistors R21 and R22 is distributed according to the ratio of the two resistances thereof. Specifically, V21:V22=(R21+R22):R22. Thus, the voltage V22 depends on the output voltage V21 of the second power source 5.

Further, the toner transfer member is a metal wire and is surrounded by the shield of metal. When transferring a toner image on the image carrier member to the recording medium sheet, a high voltage (for example, several kilovolts) is applied between the metal wire and the metal shield and thus corona discharge occurs therebetween. As a result, the recording medium sheet present in proximity to the metal wire and shield becomes positively charged. As a result, the negative polarity toner is transferred to the recording medium sheet.

During a time in which the toner transfer is not performed and thus the negative bias voltage is applied to the toner transfer member, the above-mentioned voltage V21 is one which does not produce the corona discharge. Further, because the load 15 of the toner transfer member is formed of the metal wire and shield as mentioned above, and thus includes an air gap between the toner transfer member and the ground, the resistance R30 of the load 15 is so large that R30>>R11. As a result, the bias voltage applied to the toner transfer member 15 via the output terminal 14 is approximately equal to the voltage V21.

As shown in FIG. 2, the system shown in the figure does not use the change-over switch, and thus costs required for the system may be reduced. However, even while the opposite polarity (positive polarity) bias voltage is being supplied by the first power source 1, an electric current flows through the resistors R21 and R22 in the voltage detecting circuit 13 which is connected to the second terminal T12 of the first power source 1 as shown in the figure. During this time, $$V11'=V3+V21'.$$

The voltage V21' is one appearing across the resistors R21 and R22 during this time. Thus, a power of V21'·I21 is superfluously consumed and is borne by the first power source 1.

SUMMARY OF THE INVENTION

An object of the present invention is to provide a low-cost high-efficiency power supply system for supplying bias voltages to a toner transfer member. If a change-over switch is used therein, the switch may be one not necessarily capable of enduring a high voltage.

A power supply system, according to the present invention comprises:

a first power source having a first terminal of a first polarity to be connected to a first terminal of a given load, and a second terminal of a second polarity to be connected to a second terminal of the given load via a switching element, the switching element connecting the second terminal of the first power source with the second terminal of the given load when the first power source is active;

a second power source having a first terminal of the second polarity to be connected to the second terminal of the first power source via a rectifying element, and a second terminal of the first polarity to be connected to the second terminal of the given load; and a first resistance element connected between the first and second terminals of the first power source.

The rectifying element allows an electric current to substantially flow along one direction according to the second and first polarities of the first and second terminals of the second power source though the given load, the first resistance element and the rectifying element when the second power source is instead active.

By inserting the rectifying element between the second terminal of the first power source and the first terminal of the second power source, a superfluous electric current is prevented from flowing through the second power source when only the first power source is active. Further, by inserting the switching element between the second terminal of the first power source and the second terminal of the given load, an electric current is prevented from superfluously flowing between the second terminal of the first power source and the second terminal of the given load when only the second power source is active. Thereby, power is prevented from being superfluously consumed and thus efficiency of the power supply system is improved.

Further, the switching element is inserted between the second (low voltage, for example) terminal of the first power source and the second terminal of the given load. The switching element is further connected to the first (low voltage, in this example) terminal of the second power source via the rectifying element. Therefore, in comparison to the switch 10 provided between the high (positive) -voltage terminal of the first power source 1 and the low (negative) -voltage terminal of the second power source 5 in the example shown in FIG. 1, the switch 10 may be one which should not endure a high voltage applied thereto.

It is preferable that the power supply system further comprises:

a second resistance element inserted between the switching means and the second terminal of the given load, a voltage at a connection point between the switching element and second resistance element being used for detecting an electric current flowing through the second resistance element so as to detect an output power of the first power source; and third and fourth resistance elements connected in series between the first and second terminal of the second power source, a voltage at a connection point between the third and fourth resistance elements being used for detecting an output voltage appearing between the first and second terminals of the second power source so as to detect an output power of the second power source.

In this system, the switching element can disconnect the second resistance from each of the first and second power sources.

Further, it may be that:

the given load includes discharge means for performing a discharge between the first terminal and a third terminal of the given load; and the third terminal of the given load is connected to the first terminal of the second power source.

In this system, when the first power source supplies a bias voltage to the first terminal of the given load and a discharge occurs between the first and third terminals, the discharge electric current flows between the third terminal of the given load and the second terminal of the first power source.

It is preferable that this system further comprises a third resistance element inserted between the second terminal of the second power source and the second terminal of the given load, a voltage at a connection point between the second terminal of the second power source and the third resistance element being used for detecting an electric current flowing through the third resistance element so as to detect output powers of the first and second power sources respectively.

Values of the thus-detected output powers of the first and second power sources may used as feedback signals for controlling the output powers of the first and second power sources.

The power supply system may comprise a Zener breakdown element connected in parallel with the second resistance element inserted between the switching element and the second terminal of the given load, the Zener breakdown element preventing a voltage at the connection point between the switching element and the second resistance element from excessively increasing. As a result, even if the switching element erroneously connects the second resistance with the first terminal of the second power source via the rectifying element, the Zener breakdown of the Zener breakdown element prevents the voltage at the connection point between the switching element and the second resistance element from excessively increasing.

It is preferable that, instead of inserting the Zener diode as mentioned above, a rectifying element is inserted between the second terminal of the first power source and the first resistance element.

The rectifying element allows an electric current to substantially flow through the first resistance element along a direction according to the first and second polarities of the first and second terminals of the first power source.

In the case where the Zener diode is used as mentioned above, although a voltage below a Zener voltage is applied to the Zener diode, a slight amount of an inverse-direction leakage electric current may flow through the Zener diode along its inverse direction. This inverse-direction leakage electric current may degrade an accuracy in an electric current detection performed by the first current detecting circuit as a result of thus reducing an electric current flowing through the second resistance element. The rectifying element is used instead of the Zener diode, and thus the accuracy in the electric current detection performed using the second resistance element can be prevented from being degraded due to the inverse-direction leakage current of the Zener diode.

Further, it is preferable that the system further comprises:

correction means for correcting output power of the first power source using a value of the detected electric current flowing through the third resistance element; and terminating means for terminating activation of the second power source when an abnormal situation occurrence is determined using the value of the detected electric current flowing through the third resistance element.

Other objects and further features of the present invention will become more apparent from the following detailed description when read in conjunction with the accompanying drawings.

BRIEF DESCRIPTION OF THE DRAWINGS

FIG. 9 shows a graph, illustrating a power supply system in a sixth embodiment of the present invention, for correcting a set value in output power control using a value detected through a second current detecting circuit in the power supply system shown in each of FIGS. 6, 7 and 8.

DESCRIPTION OF THE PREFERRED EMBODIMENTS

A power supply system in a first embodiment of the present invention will now be described with reference to FIG. 3. This power supply system is used in an image forming apparatus such as a well-known electrophotographic printer or the like in which a toner image formed on an image carrier member (such as a well-known photosensitive drum body or the like) is transferred to a recording medium sheet such as a sheet of paper. The power supply system supplies bias voltages to the toner transfer member (corresponding to a terminal T3 of a load 15 shown in FIG. 3) so as to transfer the toner image on the image carrier member to the recording medium sheet in proximity to the toner transfer member.

Specifically, the toner is, for example, previously negatively charged. Then, by positively charging the toner transfer member, the toner is electrically attracted to the toner transfer member of the opposite polarity and thus is transferred to the recording medium sheet. When such a toner transfer operation is not performed in the image forming apparatus, the toner transfer member may be negatively charged. As a result, due to an electrical repelling effect, the toner transfer member is prevented from being stained with the toner.

Figure 3:
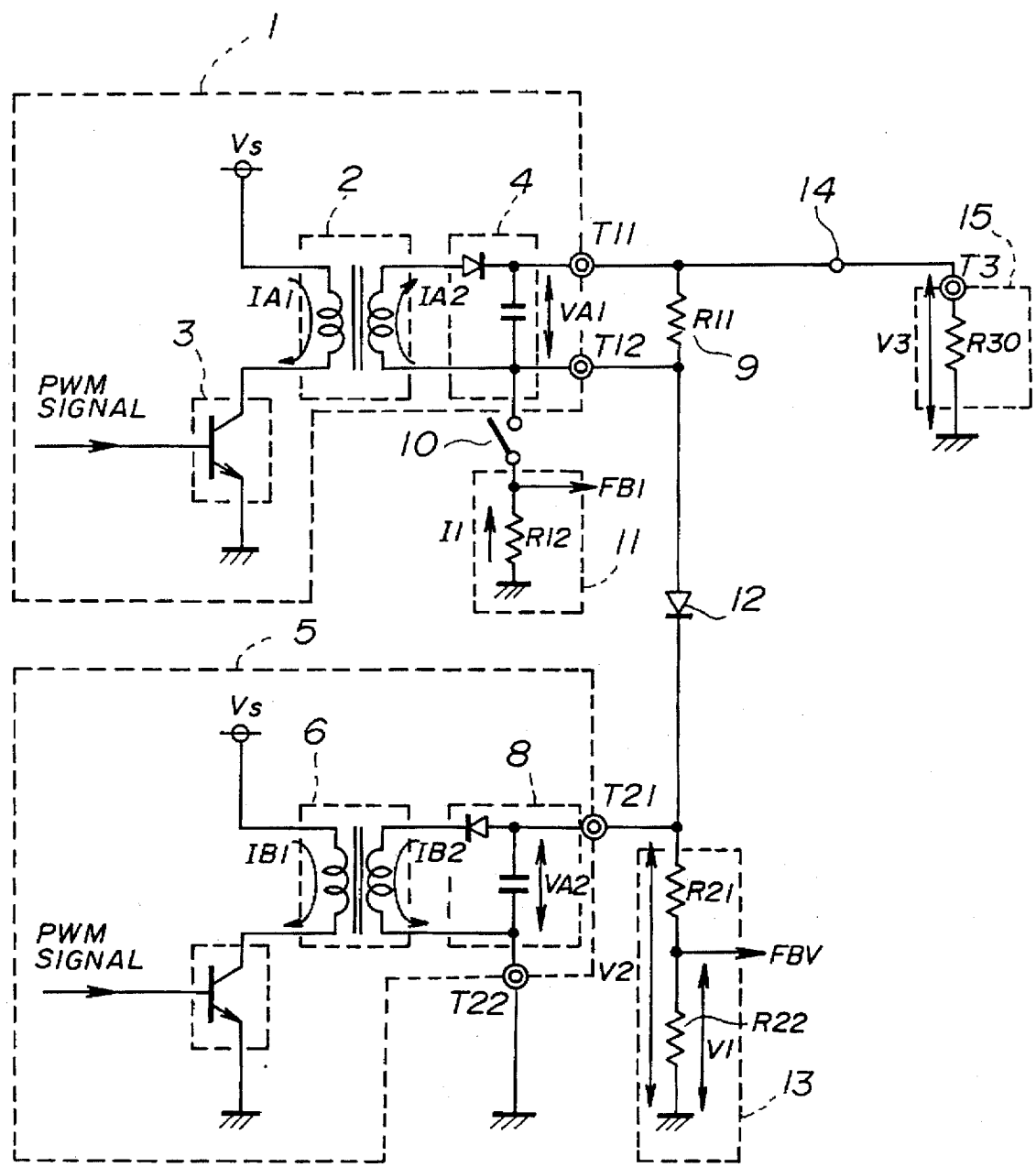
FIG. 3 shows an example of a circuit of a power supply system in a first embodiment of the present invention.

With reference to FIG. 3, a first power source 1 includes a first step-up transformer 2, a first switching element 3, and a first rectifying and smoothing circuit 4. One terminal of a primary winding of the first step-up transformer 2 is connected to a positive direct-current voltage source Vs, and the other terminal of the primary winding is connected to the first switching element 3. According to a PWM signal, the first switching element 3 changes a state thereof alternately between an ON state and an OFF state. As a result, an electric current IA1 intermittently flows through the primary winding.

Thereby, an alternating-current voltage appear across the secondary winding of the first step-up transformer 2. Then, due to a rectifying and smoothing function of the first rectifying and smoothing circuit 4 achieved on the thus-appearing voltage, an electric current IA2 flows through the secondary winding. Thus, an output power VA1 is supplied from the first rectifying and smoothing circuit 4.

Similarly, a second power source 5 includes a second step-up transformer 6, a second switching element 7, and a second rectifying and smoothing circuit 8. One terminal of a primary winding of the second step-up transformer 6 is connected to a positive direct-current voltage source Vs, and the other terminal of the primary winding is connected to the second switching circuit 7. According to a PWM signal, the second switching element 7 changes a state thereof alternately between an ON state and an OFF state. As a result, an electric current IB1 intermittently flows through the primary winding.

Thereby, an alternating-current voltage appears across the secondary winding of the second step-up transformer 6. Then, due to a rectifying and smoothing function of the second rectifying and smoothing circuit 8 achieved on the thus-appearing voltage, an electric current IB2 flows through the secondary winding. Thus, an output power VA2 is supplied from the second rectifying and smoothing circuit 8. A rectifying element is provided in the second rectifying and smoothing circuit 8 so as to allow the electric current IB1 to substantially flow along a direction. The second power source 5 has first and second terminals T21 and T22 as shown in FIG. 3.

Because the direction of the rectifying element in the first rectifying and smoothing circuit 4 is opposite to that of the rectifying element included in the second rectifying and smoothing circuit 8 as shown in FIG. 3, the output power VA2 of the second power source 5 has a polarity opposite to that of the output power VA1 of the first power source 1.

As shown in FIG. 3, a discharge resistor (R11) 9 is connected between output terminals of the first power source 1. A series circuit of a switch 10 and a resistor R12 is connected between a second terminal T12 of the first power source 1 and the ground. A first current detecting circuit 11 includes the resistor R12 and supplies a feedback signal FBI which represents a voltage at a connection point between the switch 10 and the resistor R12. The voltage is a voltage appearing across the resistor R12 due to an electric current I1 flowing through the resistor R12. Thus, the feedback signal FBI represents the electric current I1 flowing through the resistor R12.

When the first power source 1 supplies a bias voltage to the load 15 (R30) and the switch 10 is in a closed state so as to connect the resistor 12 with the first power source 1, an electric current flows from a first terminal T11 of the first power source 1, through the load 15, the resistor R12 and the switch 10, and then to the second terminal T12 of the first power source 1. Therefore, by detecting the electric current I1 flowing through the resistor R12, an output power of the first power source 1 can be determined.

Further, a series circuit of resistors R21 and R22 is connected between the first terminal T21 of the second power source 5 and the ground. Thus, the series circuit is connected between the first and second terminals T21 and T22 of the second power source 5. A voltage detecting circuit 13 includes the resistors R21 and R22, and supplies a feedback signal FBV which represents a voltage V1 at a connection point between the two resistors R21 and R22. This voltage V1 is obtained as a result of distributing an output voltage V2 of the second power source 5 according to a ratio of V2 to V1 obtained from the following equation:

$$V2:V1=(R21+R22):R22.$$

Thus, the feedback signal FBV represents the output voltage V2 of the second power source 5.

A negative bias voltage V3 applied to the load 15 when the second power source 5 supplies the bias power is obtained by the following equation:

$$V3=V2\cdot\{R30/(R11+R30)\}$$

where R30 represents a resistance of the load 15.

A rectifying element 12 is inserted between the second terminal T12 of the first power source 1 and the first terminal T21 of the second power source 5. A direction of the rectifying element 12 is such as to allow, when the second power source 5 supplies the negative bias voltage to the load 15, an electric current to flow from the ground, through the load 15 and the discharge resistor R11, and then to the first terminal T21 of the second power source 5. However, when the first power source 1 supplies the positive bias voltage to the load 15, an electric current is not allowed to flow from the ground, through the series circuit of the resistors R21 and R22, and then to the second terminal T12 of the first power source 1.

Figure 2:
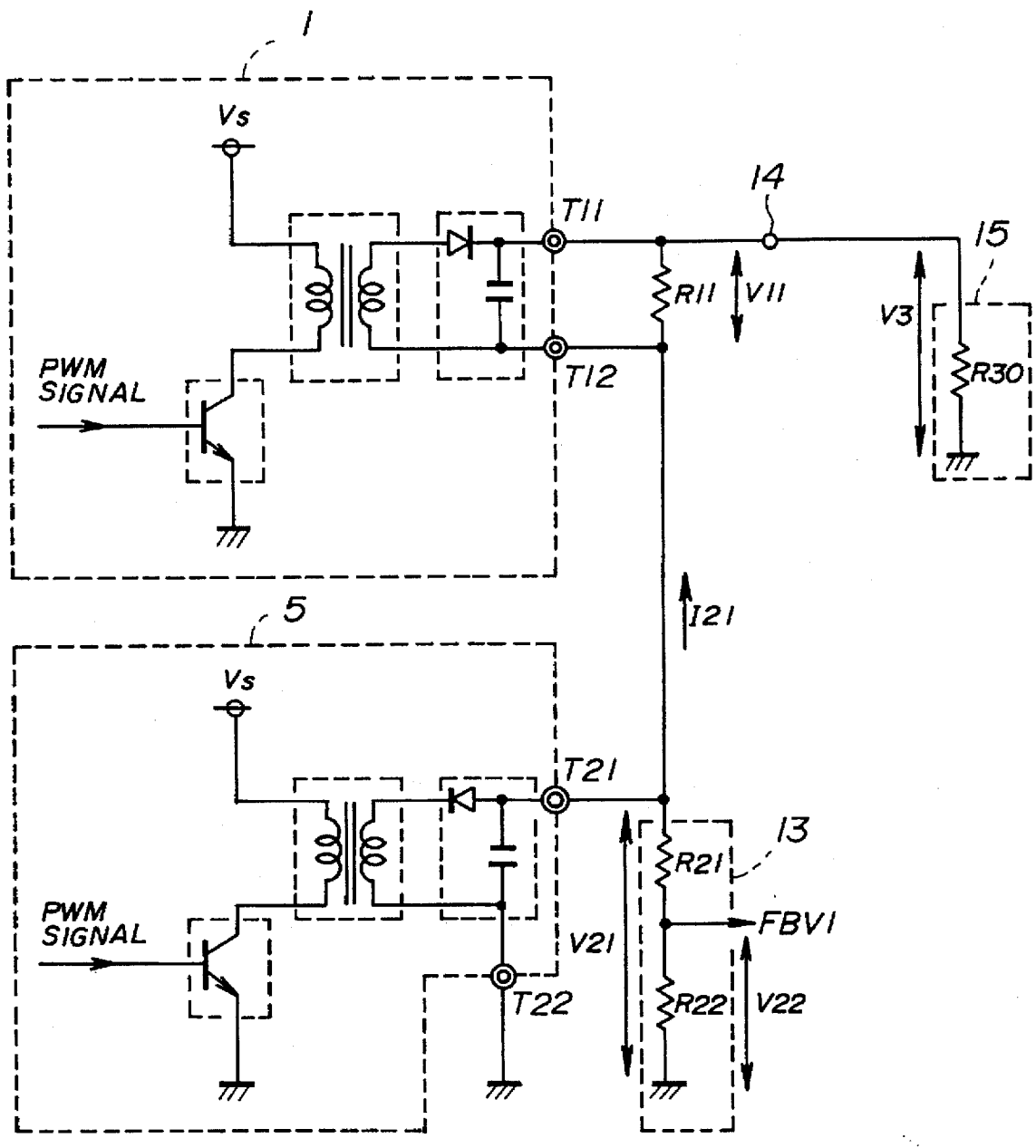
FIG. 2 shows another example of a circuit of a power supply system in the related art.

Thus, the above-mentioned problem occurring in the example shown in FIG. 2 is eliminated. That is, an electric current is prevented from superfluously flowing through the series-connected resistors R21 and R22 when the first power source 1 supplies the positive bias voltage to the load 15. Thereby, power is prevented from being superfluously consumed and thus efficiency of the power supply system is improved.

Figure 4:
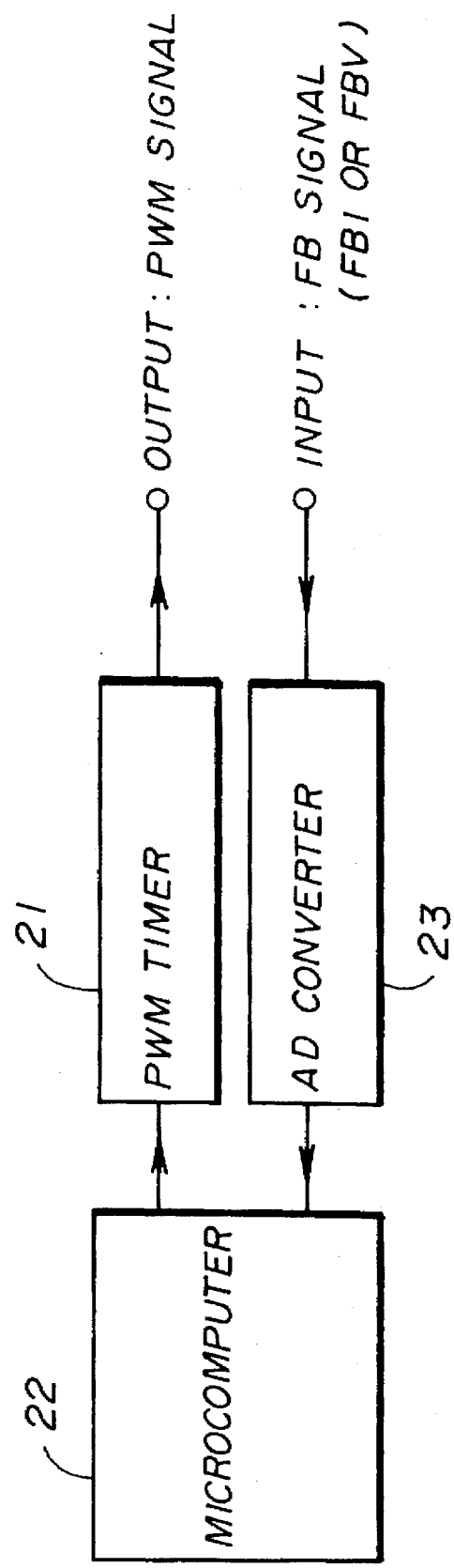
FIG. 4 shows an arrangement in each of first and second power sources, in the power supply system shown in FIG. 3, for generating a PWM signal.

The PWM signal is generated by an arrangement shown in FIG. 4. This arrangement may be provided in each of the first and second power sources 1 and 5. Further, this arrangement may be a common one for both the first and second power sources 1 and 5. This arrangement includes a PWM timer 21, a microcomputer 22 and an A-D converter 23. The PWM timer 21 generates the PWM signal (pulse signal) under control of the microcomputer 22. The microcomputer 22 has a set value in a memory thereof and compares the set value as a reference value with a value of a respective one of the feedback signals FBI and FBV. Then, microcomputer 22 controls each pulse span of the PWM signal generated by the PWM timer 21 according to a result of comparison so as to cause the value of the feedback signal to approximate the set value. The A-D converter converts the analog value carried by the feedback signal into digital data so as to be able to be processed by the microcomputer 22.

When the first power source 1 is driven, the switch 10 is in the closed state and thus connects the first current detecting circuit 11 to the second terminal T12 of the first power source 1. As mentioned above, the PWM signal (pulse signal) is supplied to the first switching element 3 and thus the electric current IA1 flows through the primary winding of the first step-up transformer 2 intermittently. Then, the alternate-current voltage is induced in the secondary winding of the transformer 2 and the bias power VA1 is supplied from the first rectifying and smoothing circuit 4.

As described above, the output power VA1 is detected as the electric current I1 flowing through the resistor R12 of the first current detecting circuit 11. Thus, the relevant feedback signal FBI is supplied from the first current detecting circuit 11 to the A-D converter 23 shown in FIG. 4. Then, the microcomputer 22 controls the PWM timer 21 using the thus-supplied feedback signal FBI as described above. Because the feedback signal FBI represents the output electric current I1, the control performed by the microcomputer 22 is the constant-current control. Thus a stable output is supplied to the load 15 via a first output terminal 14.

When the second power source 5 is driven, the switch 10 is in the open state and thus disconnects the first current detecting circuit 11 from the second terminal T12 of the first power source 1. As a result, an electric current is prevented from superfluously flowing through the resistor R12 from the ground, through the rectifying element 12, and then to the first terminal T21 of the second power source 5. Thereby, it is prevented that an excessive voltage is applied to the resistor R12.

As described above, the PWM signal (pulse signal) is supplied to the second switching element 7 and thus the electric current IB1 flows through the primary winding of the second step-up transformer 6 intermittently. Then, the alternating-current voltage is induced in the secondary winding of the transformer 6 and the bias power VA2 is supplied from the second rectifying and smoothing circuit 8.

As described above, the output power VA2 is detected as the output voltage V2 and then as the voltage V1 appearing at the resistor R22 of the voltage detecting circuit 13. Thus, the relevant feedback signal FBV is supplied from the voltage detecting circuit 13 to the A-D converter 23 shown in FIG. 4. Then, the microcomputer 22 controls the PWM timer 21 using the thus-supplied feedback signal FBV as described above. Because the feedback signal FBV represents the output voltage V2, the control performed by the microcomputer 22 is the constant-voltage control. Thus a stable output is supplied to the load 15 via the first output terminal 14.

Figure 1:
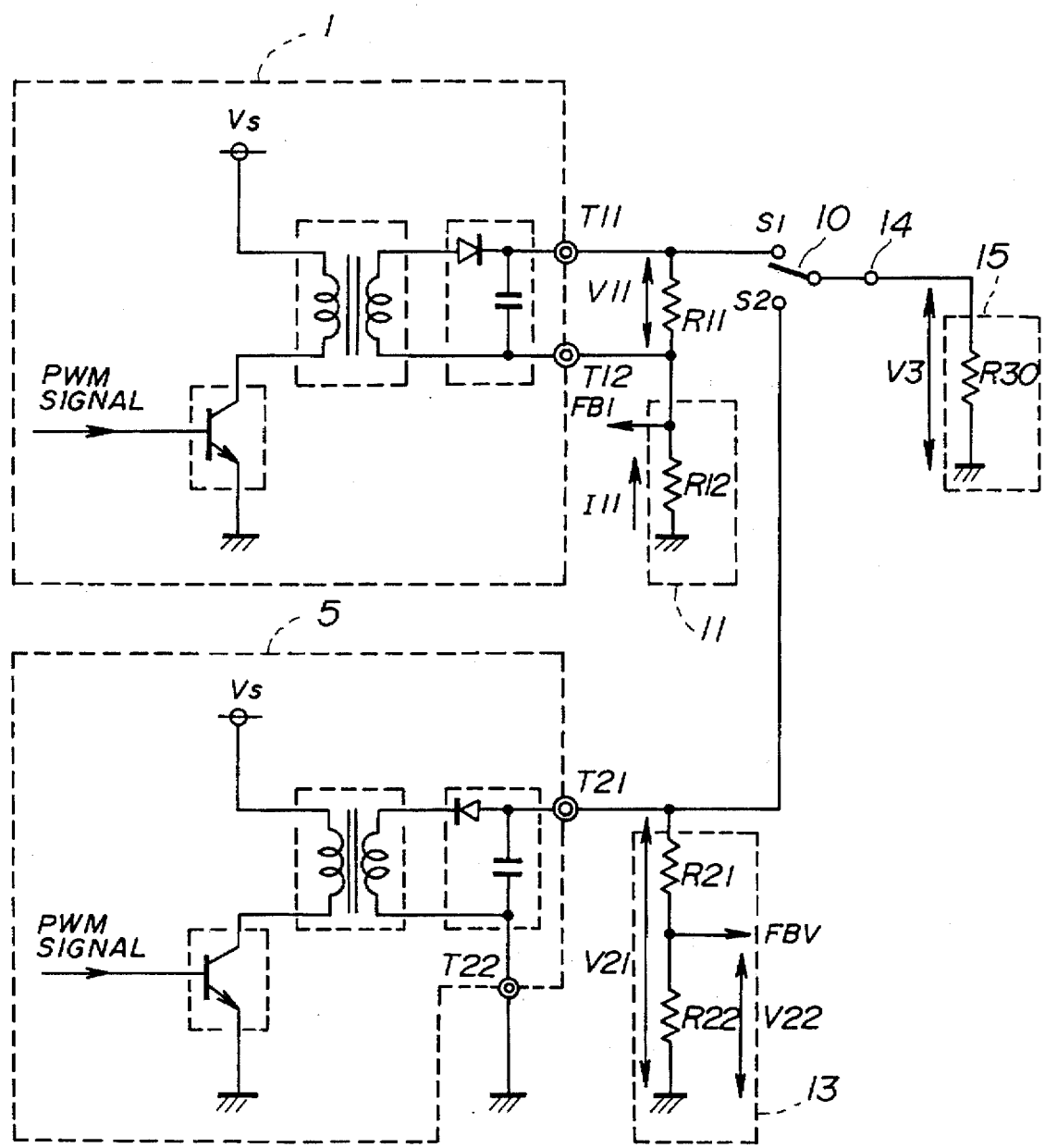
FIG. 1 shows an example of a circuit of a power supply system in the related art.

In this power supply system in the first embodiment shown in FIG. 3, the switch 10 is connected to the second terminal T12 of the first power source 1 and to the first terminal T21 of the second power source 5 via the rectifying element 12. Therefore, in comparison to the switch provided between the high (positive) -voltage terminal of the first power source 1 and the low (negative) -voltage terminal of the second power source 5 in the example shown in FIG. 1, the switch 10 may be one which should not endure a high voltage applied thereto.

Figure 5:
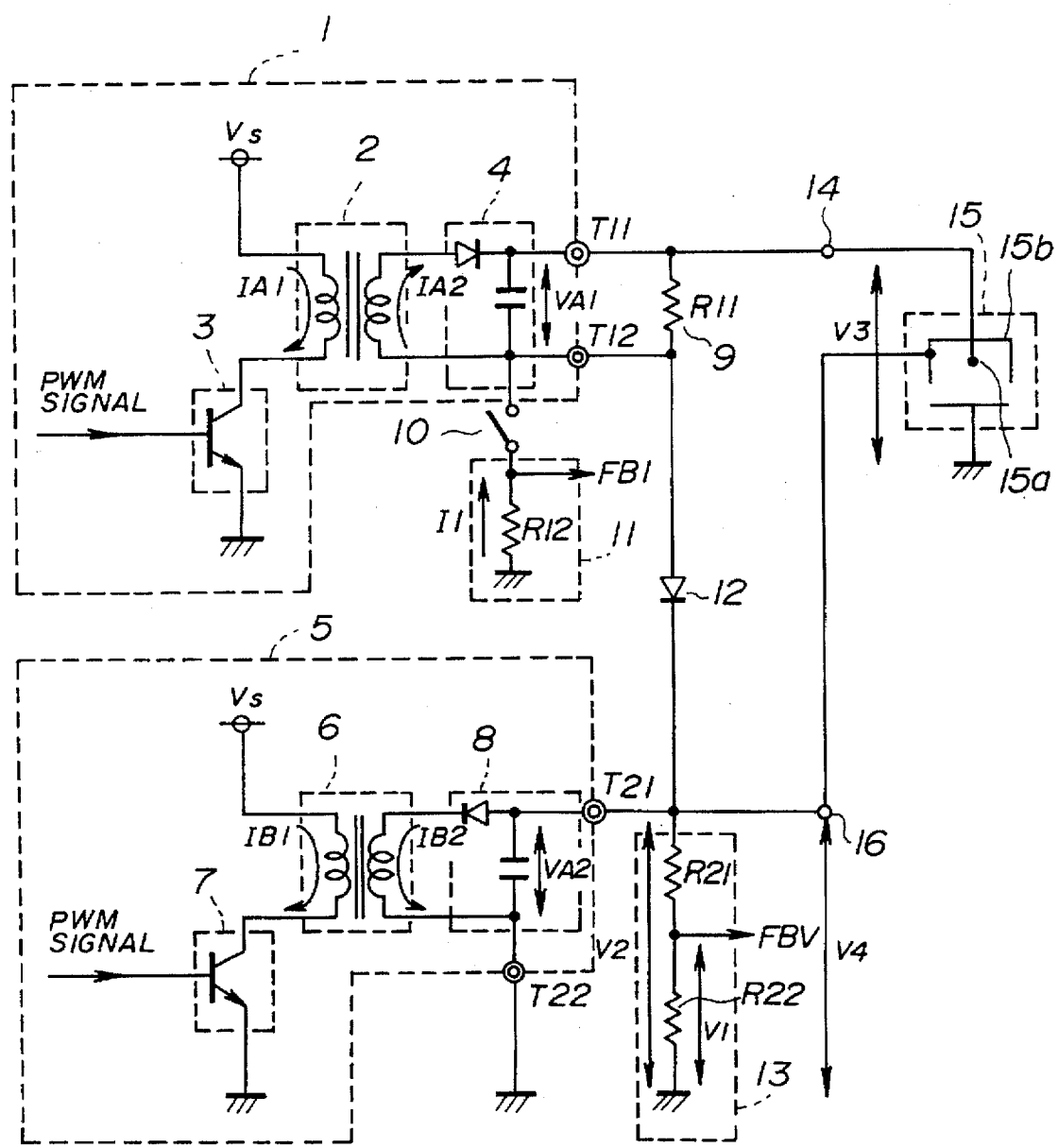
FIG. 5 shows an example of a circuit of a power supply system in a second embodiment of the present invention.

With reference to FIG. 5, a power supply system in a second embodiment of the present invention will now be described. With reference to FIGS. 3 and 5 comparatively, almost all of a circuit structure of the power supply system in the second embodiment shown in FIG. 5 is the same as that of the power supply system in the first embodiment shown in FIG. 3. However, in FIG. 5, the load 15, acting as a toner transfer unit, is indicated as a well-known corona discharger including a metal wire 15a (corresponding to the toner transfer member) and a metal shield 15b surrounding the metal wire 15a.

When the positive bias voltage such as that of several kilovolts is applied to the metal wire 15a, corona discharge occurs between the metal wire 15a and the metal shield 15b. As a result, a recording medium sheet in proximity to the corona discharger 15 is charged positively. Thereby, the above-described toner transfer operation is performed.

The metal shield 15b is connected to a second output terminal 16 which is connected to the low-voltage terminal T21 of the second power source 5. When the first power source 1 supplies the positive bias voltage to the corona discharger 15, due to the corona discharge, an electric current flows from the metal wire 15a, through the metal shield 15b, the second output terminal 16, the rectifying element included in the second rectifying and smoothing circuit 8 and the secondary winding of the second step-up transformer 6, and to the ground. In such an electrophotographic image forming apparatus, it is well known to arrange so as to cause an electric current which has flown from a corona discharger into a member to be charged, such as a photosensitive drum, a photosensitive belt, a recording-medium paper sheet and so forth, to then flow into the ground.

In the power supply system in the second embodiment shown in FIG. 5, when the second power source 5 supplies the negative bias voltage to the corona discharger 15, the output voltage V2 of the second power source 5 is one which does not cause the corona discharge in the corona discharger 15. A negative bias voltage applied to the metal shield 15b is the same as the output voltage V2 of the second power source 5.

Further, during this time, the bias voltage V3 applied to the metal shield 15b of the corona discharger 15 is obtained, as mentioned above, by the following equation:

$$V3 = V2 - \{R30/(R11+R30)\}.$$

In this embodiment, the resistance R30 of the load 15 is that between the metal wire 15a and the metal shield 15b of the corona discharger 15. Because an air gap is present between the metal wire 15a and the metal shield 15b, the R30 is very large and thus R30>>R11. As a result, V3 is approximately equal to V2. Thus, approximately the same negative bias voltages are applied to the metal wire 15a and metal shield 15b of the corona discharger 15. As a result, both the metal wire 15a and metal shield 15b are prevented from being stained with the negative charged toner.

Figure 6:
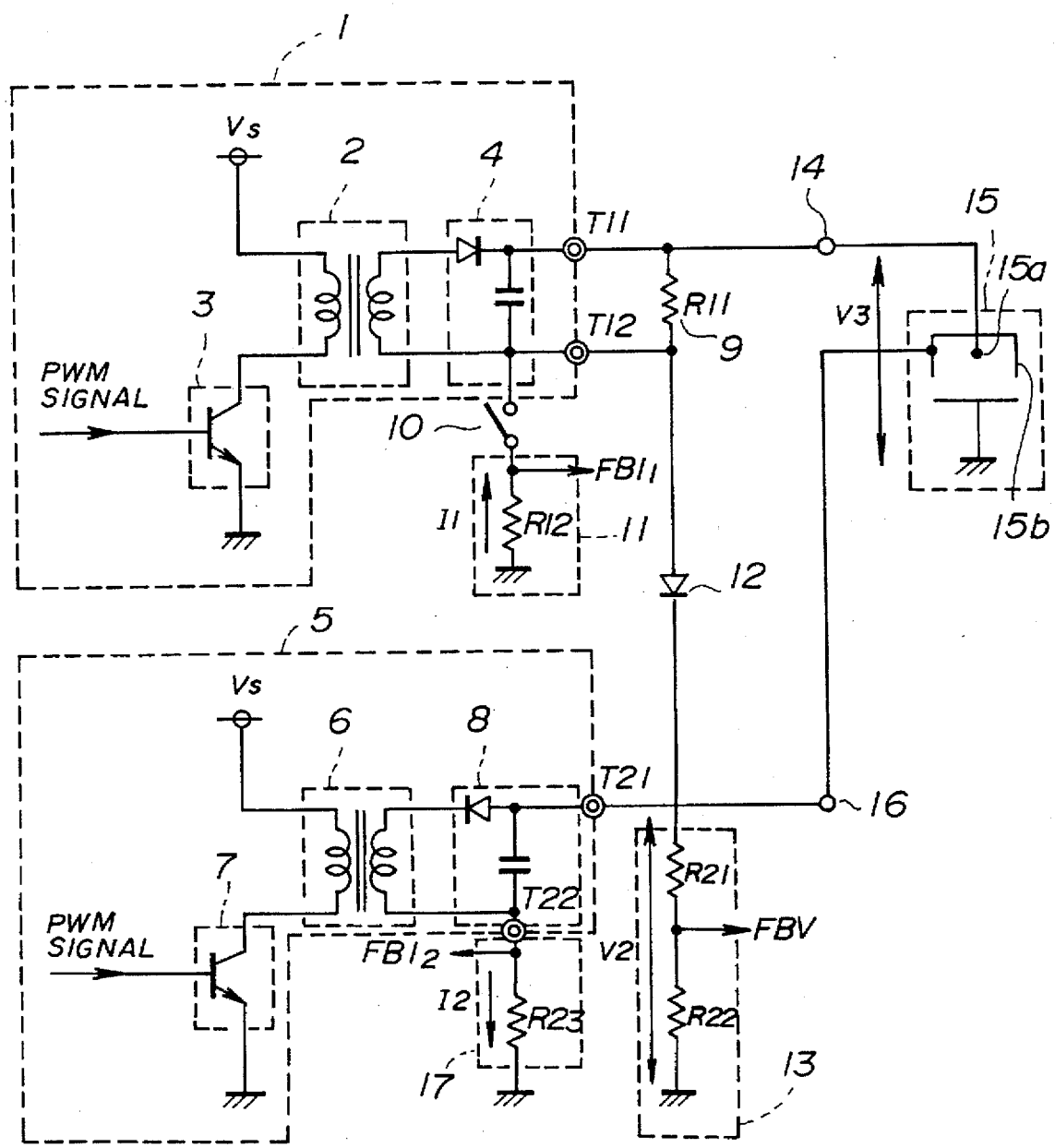
FIG. 6 shows an example of a circuit of a power supply system in a third embodiment of the present invention.

With reference to FIG. 6, a power supply system in a third embodiment of the present invention will now be described. With reference to FIGS. 5 and 6 comparatively, almost all of a circuit structure of the power supply system in the third embodiment shown in FIG. 6 is the same as that of the power supply system in the second embodiment shown in FIG. 5. However, a second current detecting circuit 17 including a resistor R23 is inserted between the second terminal T22 of the second power source 5 and the ground.

When the first power source 1 supplies the positive bias voltage, this second current detecting circuit 17 detects an electric current I2 flowing through the resistor R23 by detecting a voltage appearing across the resistor R23 due to the current I2 flowing therethrough. The current I2 flows from the metal shield 15b of the corona discharger 15 due to the corona discharge thereof, and then through the rectifying element of the second rectifying and smoothing circuit 8, the secondary winding of the second step-up transformer 6, and then the resistor R23.

Further, the second current detecting circuit 17 is used to detect an electric current flowing through the metal wire 15a and metal shield 15b. By detecting the electric current flowing through the metal wire 15a and metal shield 15b, how the metal shield 15b has been stained can be detected. Thereby, it is possible to finely correct an output set value of the first power source 1 and thus an appropriate discharging state in the metal wire 15a and metal shield 15b (corona discharger) can be achieved.

When the second power source 5 supplies the negative bias voltage, the same second current detecting circuit 17 detects an output electric current of the second power source 5 flowing through the corona discharger 15. Thereby, the second current detecting circuit 17 detects an abnormal state such as a short-circuiting failure.

Figure 7:
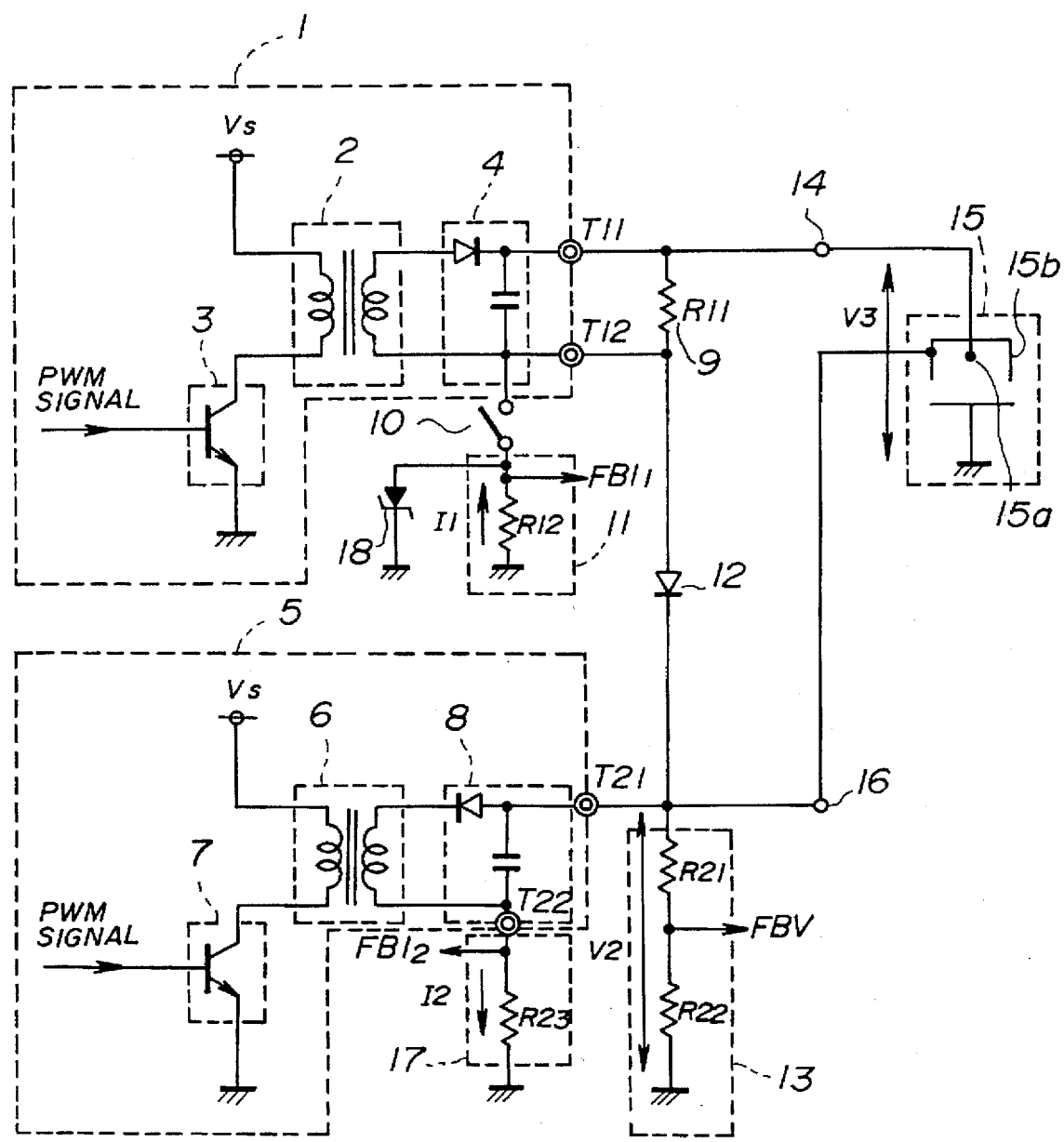
FIG. 7 shows an example of a circuit of a power supply system in a fourth embodiment of the present invention.

With reference to FIG. 7, a power supply system in a fourth embodiment of the present invention will now be described. With reference to FIGS. 6 and 7 comparatively, almost all of a circuit structure of the power supply system in the fourth embodiment shown in FIG. 7 is the same as that of the power supply system in the third embodiment shown in FIG. 6. However, a well-known Zener diode 18 is connected in parallel to the resistor R12 of the first current detecting circuit 11. This modification of additionally connecting the Zener diode 18 may also be performed on each of the above-described first and second embodiments shown in FIGS. 3 and 5.

Advantage obtained from this modification will now be described. There may be a case in which the switch 10 erroneously operates and is thus in the closed state even though the second power source 5 supplies the negative bias voltage. In this case, the output voltage V2 of the second power source 5 and thus excessive voltage is applied to the first current detecting circuit 11 via the rectifying element 12. Well known Zener breakdown occurs in the Zener diode 18 when such an excessive voltage is applied across the Zener diode and thus across the resistor R12. Thereby, the first current detecting circuit 17 is prevented from being applied of an excessive voltage even if the switch 10 erroneously operates.

Figure 8:
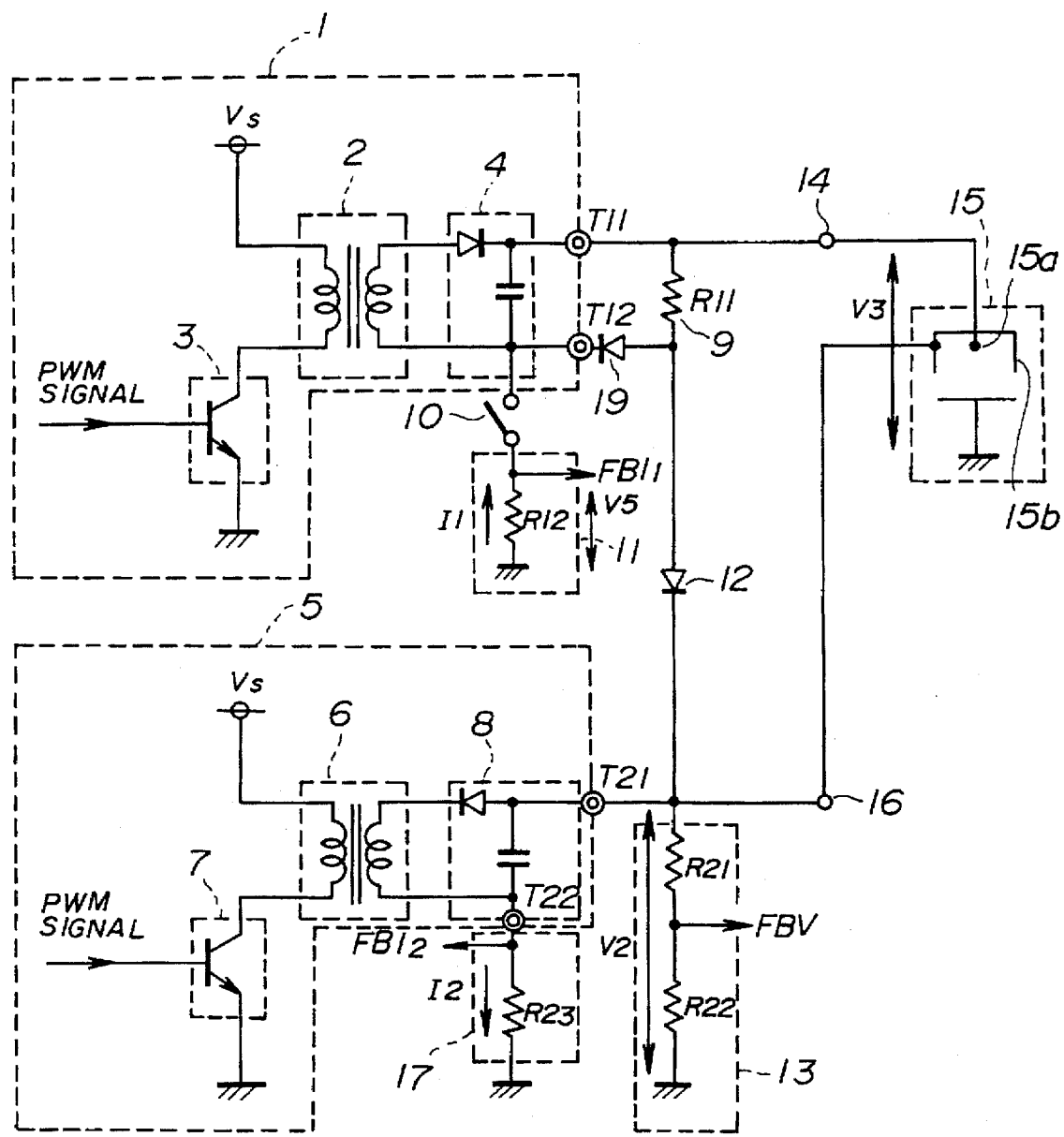
FIG. 8 shows an example of a circuit of a power supply system in a fifth embodiment of the present invention.

With reference to FIG. 8, a power supply system in a fifth embodiment of the present invention will now be described. With reference to FIGS. 6 and 8 comparatively, almost all of a circuit structure of the power supply system in the fifth embodiment shown in FIG. 8 is the same as that of the power supply system in the third embodiment shown in FIG. 6. However, a rectifying element 19 is inserted between the second terminal T12 of the first power source 1 and the discharge resistor R11. This rectifying element 19 has a direction such that, when the first power source 1 supplies the positive bias voltage, an electric current substantially flows therethrough after flowing through the discharge resistor R11.

The above-mentioned case will now be considered again where the switch 10 is erroneously in the closed state when the second power source 5 supplies the negative bias voltage and thus the output voltage V2 of the second power source 5 is applied via the rectifying element 12. However, the rectifying element 19 substantially disconnects a direct path between the first terminal T21 of the second power source 5 and the second terminal T12 of the first power source 1 in this case because the negative output voltage V2 is applied to the anode of the rectifying element 19. Therefore, the negative output voltage V2 of the second power source 5 is distributed by the resistances R11 and R12. That is, where a voltage applied across the first current detecting circuit 11 is referred to as V5 as shown in FIG. 8, $$V5:V2=R12:R11+R12.$$

Because R12<<R11, it is possible to effectively reduce the voltage applied to the first current detecting circuit 11. Thus, provision of the rectifying element 19 prevents the excessive voltage from applying the first current detecting circuit 11.

Further, in the case where the Zener diode 18 is used as in the fourth embodiment, although a voltage below a Zener voltage is applied to the Zener diode, a slight amount of an inverse-direction leakage electric current may flow through the Zener diode along its inverse direction. This inverse-direction leakage electric current may degrade an accuracy in an electric current detection performed by the first current detecting circuit 11 as a result of thus reducing an electric current flowing through the resistor R12. The rectifying element 19 is used instead of the Zener diode 18 in the fifth embodiment, and thus the accuracy in the electric current detection performed by the first current detecting circuit 11 can be prevented from being degraded due to the inverse-direction leakage current of the Zener diode 18.

Similar modification of inserting the rectifying element 19 may also be performed on each of the first and second embodiments and thus variants may be created. That is, in each of the first and second embodiment, the rectifying element 19 is inserted between the second terminal T12 of the first power source 1 and the discharge resistor R11. This rectifying element 19 has a direction such that, when the first power source 1 supplies the positive bias voltage, an electric current substantially flows therethrough after flowing through the discharge resistor R11. Thus, the variants are created.

A power supply system according to a sixth embodiment of the present invention will now be described. This power supply system may be obtained as a result of performing a modification on any embodiment described above having the second current detecting circuit 17, such as the third embodiment shown in FIG. 6. The modification is such that the microcomputer 22 shown in FIG. 4 has a function of correcting the previously stored set value according to the value of the feedback signal $FBI_2$ supplied by the second current detecting circuit 17. Specifically, the microcomputer 22 has data tables, previously stored in a memory thereof, such as that having data indicated by a graph shown in FIG. 9.

When the first power source 1 supplies the positive bias voltage to the corona discharger 15, the discharge electric current is distributed into a first current flowing directly to the ground from the metal wire 15a via an air gap and the above-mentioned member to be charged, and a second current flowing into the metal shield 15b from the metal wire 15a via an air gap. The second current then flows through the second output terminal 16, the rectifying element in the second rectifying and smoothing circuit 8, the secondary winding of the second step-up transformer 6 and then the second current detecting circuit 17. Further, an increase of an electric current, such as the above-mentioned second current, flowing between a metal wire and a metal shield such as those 15a and 15b via an air gap, due to staining of the metal wire is well known.

Therefore, as mentioned above, the second current detecting circuit 17 is used to detect this electric current flowing through the metal wire 15a and metal shield 15b. By detecting the electric current flowing through the metal wire 15a and metal shield 15b, how the metal shield 15b has been stained can be detected. Thereby, it is possible to finely correct an output set value of the first power source 1 and thus an appropriate discharging state in the metal wire 15a and metal shield 15b (corona discharger) can be achieved. Thus, the above-mentioned correction of the set value according to the detected value of I2 obtained through the second current detecting circuit 17 is effective.

Specifically, when the first power source 1 supplies the positive bias voltage, the microcomputer 22 selects an appropriate one from among the stored data tables according to the detected value and the current set value. Each data table has data such as that indicated by the graph shown in FIG. 9 and a number of the stored data tables corresponds to a number of possible current set values. FIG. 9 shows an example of the data for a case where an original set value is 200 μA. In this example, if the detected electric current is 150 μA, no correction should be made. As the detected value is larger above 150 μA, correction should be made so as to increase the set value according to the curve shown in FIG. 9.

When the original set value is S1, the detected value is K and a function name is α, the corrected set value S1' is obtained by the following equation:

$$S1'=\alpha(S1, K).$$

In a case where the microcomputer 22 has a function such that the current set value may be continuously altered, in order to prevent a data amount to be stored from increasing, a correction curve is approximated by a straight line and only a gradient of the straight line is stored. Thus, $$S1'=\alpha(S1)\cdot k+\beta(S1).$$

There, $\alpha(S1)$ is the gradient for the original set value S1 and $\beta(S1)$ is a section for the original set value S1. Thereby, each data table having two-dimensional data such as that indicated by FIG. 9 can be replace by a respective data table having two values. Thus, simplification of relevant data and operation program can be achieved.

When the second power source 5 supplies the negative bias voltage, an output electric current I3 of the second power source 5 is obtained by the following equation:

$$I3=V2/(R21+R22),$$

where V2 is the output voltage of the second power source 5 applied across the series circuit of the resistors R21 and R22. If V2 is a voltage which does not produce corona discharge in the corona discharger 15, I2 which is detected through the second current detecting circuit 17 should be equal to the above-mentioned output electric current I3 of the second power source 5, in the circuit such as that shown in FIG. 6. Therefore, the microcomputer 22 may have a function such that, if I2>I3, where I3 is the above-mentioned output electric current of the second power source 5, the microcomputer 22 determines that some trouble such as a corona discharger short-circuit failure occurs. If such determination is made, the microcomputer 22 terminates the drive of the second power source 5.

In each of the above-described embodiments, there is no possibility that both the first power source 1 and second power source 5 are driven simultaneously.

Further, in each of the embodiments, the direct-current power source Vs is a positive power source.

Further, the present invention is not limited to the above-described embodiments, and variations and modifications may be made without departing from the scope of the present invention.

What is claimed is:

1. A power supply system comprising:

a first power source having a first terminal of a first polarity to be connected to a first terminal of a given load, and a second terminal of a second polarity to be connected to a second terminal of said given load via a switching element, said switching element connecting said second terminal of said first power source with said second terminal of said given load when said first power source is active;

a second power source having a first terminal of the second polarity to be connected to said second terminal of said first power source via a rectifying element, and a second terminal of the first polarity to be connected to said second terminal of said given load; and a first resistance element connected between said first and second terminals of said first power source;

wherein said rectifying element allows an electric current to substantially flow along one direction according to said second and first polarities of said first and second terminals of said second power source though said given load, said first resistance element and said rectifying element when said second power source is instead active.

2. The power supply system, according to claim 1, wherein:

said first power source includes a step-up transformer having a primary winding and a secondary winding, and a rectifying element, a direct-current voltage source of the first polarity and a switching element being connected to said primary winding, said switching element alternately enabling and disabling an electric current flowing through said primary winding and thus causing an alternate-current voltage to appear across said secondary winding, said rectifying element allowing an electric current to substantially flow through said secondary winding along a direction such that the first and second polarities appear at said first and second terminals respectively; and said second power source includes a step-up transformer having a primary winding and a secondary winding, and a rectifying element, a direct-current voltage source of the first polarity and a switching element being connected to said primary winding, said switching element alternately enabling and disabling an electric current flowing through said primary winding and thus causing an alternating-current voltage to appear across said secondary winding, said rectifying element allowing an electric current to substantially flow through said secondary winding along a direction such that the second and first polarities appear at said first and second terminals respectively.

3. The power supply system, according to claim 1, further comprising:

a second resistance element inserted between said switching means and said second terminal of said given load, a voltage at a connection point between said switching element and second resistance element being used for detecting an electric current flowing through said second resistance element so as to detect an output power of said first power source; and third and fourth resistance elements connected in series between said first and second terminal of said second power source, a voltage at a connection point between said third and fourth resistance elements being used for detecting an output voltage appearing between said first and second terminals of said second power source so as to detect an output power of said second power source.

4. The power supply system according to claim 1, wherein:

said given load includes discharge means for performing of discharge between said first terminal and a third terminal of said given load; and said third terminal of said given load is connected to said first terminal of said second power source.

5. The power supply system according to 1, further comprising a second resistance element inserted between said second terminal of said second power source and said second terminal of said given load, a voltage at a connection point between said second terminal of said second power source and said second resistance element being used for detecting an electric current flowing through said second resistance element so as to detect output powers of said first and second power sources respectively.

6. The power supply system, according to claim 3, further comprising a Zener breakdown element in parallel with said second resistance element, said Zener breakdown element preventing a voltage at the connection point between said switching element and said second resistance element from excessively increasing.

7. The power supply system according to claim 3, further comprising a rectifying element inserted between said second terminal of said first power source and said first resistance element, said rectifying element allowing an electric current to substantially flow through said first resistance element along a direction according to said first and second polarities of said first and second terminals of said first power source.

8. The power supply system according to claim 5, further comprising:

correction means for correcting output power of said first power source using a value of the detected electric current flowing through said second resistance element; and terminating means for terminating activation of said second power source when an abnormal situation occurrence is determined using the value of the detected electric current flowing through said second resistance element.

* * * * *